(12) United States Patent
Hahn et al.

(10) Patent No.: US 8,193,886 B2
(45) Date of Patent: *Jun. 5, 2012

(54) RECEPTION UNIT COMPRISING A RECEIVER COIL FOR THE CONTACTLESS TRANSFER OF ELECTRIC ENERGY AND METHOD FOR THE PRODUCTION THEREOF

(75) Inventors: Wolfgang Hahn, Kassel (DE); Qinghua Zheng, Taufkirchen (DE); Andreas Diekmann, München (DE)

(73) Assignee: ThyssenKrupp Transrapid GmbH, Kassel (DE)

( * ) Notice: Subject to any disclaimer, the term of this patent is extended or adjusted under 35 U.S.C. 154(b) by 467 days.

This patent is subject to a terminal disclaimer.

(21) Appl. No.: 12/444,945

(22) PCT Filed: Sep. 4, 2007

(86) PCT No.: PCT/DE2007/001567
§ 371 (c)(1),
(2), (4) Date: Apr. 9, 2009

(87) PCT Pub. No.: WO2008/043326
PCT Pub. Date: Apr. 17, 2008

(65) Prior Publication Data
US 2010/0072815 A1 Mar. 25, 2010

(30) Foreign Application Priority Data
Oct. 11, 2006 (DE) .......... 10 2006 048 829

(51) Int. Cl.
*H01F 5/00* (2006.01)
*H01F 27/02* (2006.01)

(52) U.S. Cl. ........ 335/299; 335/219; 335/284; 335/296; 336/90; 104/286; 191/10; 29/602.1

(58) Field of Classification Search ............. 335/219, 335/284, 296, 299; 336/90, 115, 117, 119; 104/281, 284, 286; 191/10; 246/194; 29/602.1
See application file for complete search history.

(56) References Cited

U.S. PATENT DOCUMENTS

| | | | | |
|---|---|---|---|---|
| 3,255,512 A * | 6/1966 | Lochner et al. | ............... | 29/602.1 |
| 3,675,174 A * | 7/1972 | Horbach | ................. | 335/299 |
| 3,797,403 A * | 3/1974 | Schwarzler et al. | .......... | 104/284 |
| 3,895,585 A * | 7/1975 | Schwarzler | ................ | 104/290 |
| 4,987,398 A * | 1/1991 | Bessho | ................... | 335/299 |
| 5,025,240 A * | 6/1991 | La Croix | ................... | 335/284 |
| 5,666,883 A * | 9/1997 | Kuznetsov | ............... | 104/281 |
| 6,584,671 B2 * | 7/2003 | Miller et al. | ................ | 29/596 |
| 7,523,542 B2 * | 4/2009 | Kawarai | ................... | 29/602.1 |
| 7,907,041 B2 * | 3/2011 | Hahn et al. | ................ | 336/90 |
| 2008/0236973 A1 * | 10/2008 | Hahn et al. | ................ | 191/10 |

FOREIGN PATENT DOCUMENTS

| | | |
|---|---|---|
| DE | WO 2005/090112 | 9/2005 |
| DE | 102004056439 | 10/2005 |
| JP | 2001-320803 | 11/2001 |
| NZ | WO 95/11545 | 4/1995 |

* cited by examiner

Primary Examiner — Lincoln Donovan
Assistant Examiner — Mohamad Musleh
(74) Attorney, Agent, or Firm — McGlew and Tuttle, P.C.

(57) ABSTRACT

A reception unit is provided including a receiver coil for the contactless transfer of electric energy. The receiver coil includes a plurality of flux guiding elements (16a, 16b) that are made of a highly permeable material and that are designed to concentrate the field lines. The flux guiding elements (16a, 16b) form a continuous molded part that is embodied in a base body (18) and that is combined with the base body to form a component that can be completely prefabricated. The molded part is produced by casting and the base body (18) is used as a casting mold.

22 Claims, 6 Drawing Sheets

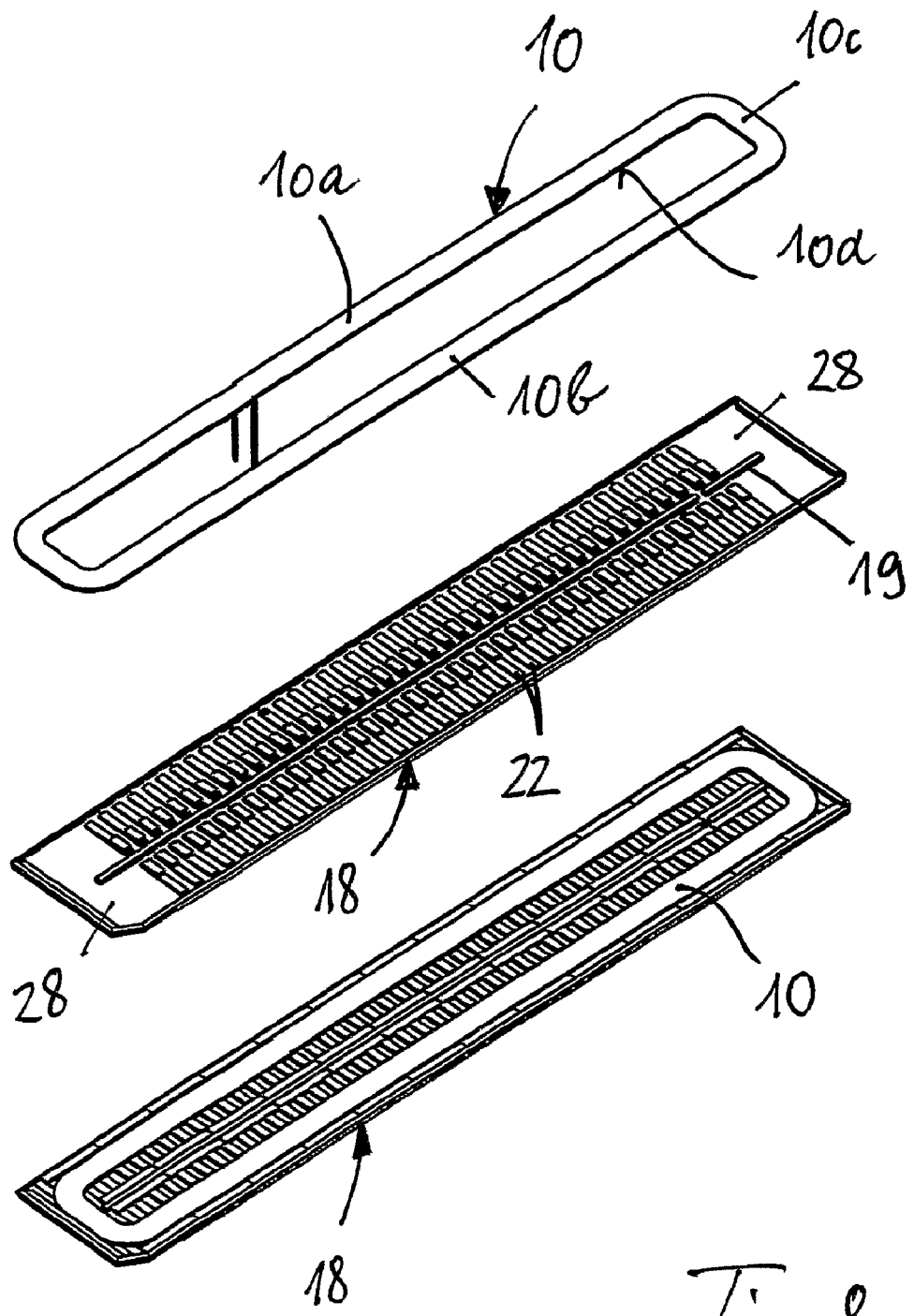

RECEPTION UNIT COMPRISING A RECEIVER COIL FOR THE CONTACTLESS TRANSFER OF ELECTRIC ENERGY AND METHOD FOR THE PRODUCTION THEREOF

CROSS REFERENCE TO RELATED APPLICATIONS

This application is a United States National Phase application of International Application PCT/DE2007/001567 and claims the benefit of priority under 35 U.S.C. §119 of German Patent Application DE 10 2006 048 829.6 filed Oct. 11, 2006, the entire contents of which are incorporated herein by reference.

FIELD OF THE INVENTION

The present invention pertains to a receiving unit with a receiver coil for the contactless transmission of electric power, wherein a plurality of flux-conducting elements, which are intended to concentrate lines of flux and which consist of a material with high permeability compared to that of air, are associated with the receiver coil and the present invention pertains to a process for manufacturing such a receiving unit.

BACKGROUND OF THE INVENTION

Receiving units of this type are known (DE 10 2004 056 439 A1). They are used especially in magnetic levitation trains for the contactless, inductive transmission of electric power from a track to a vehicle. At least one primary conductor, which is designed as a transmitting coil and is connected to a power source, is provided for this purpose at the track and at least one secondary receiver coil is provided at the vehicle. This coil is preferably designed as part of a receiving unit and is fastened with this to a magnetic back box, which has the carrier magnets and is in turn connected to an undercarriage or body of the vehicle via frame straps.

To improve the magnetic coupling between the primary conductor and the receiver coil and to avoid eddy current losses, the receiver coil is provided with means for concentrating the lines of magnetic flux generated by the primary conductor on its side facing away from the primary conductor. These means contain flux-conducting elements in the form of strips and connection elements, which connect the ends thereof and consist of a material having high permeability and high electrical resistance, preferably a ferrite, especially a soft ferrite. The strips and connection elements are connected into a grid frame to be placed on the receiver coil by bonding or according to another method.

Flux-conducting elements are manufactured from a material such as ferrite or the like by pressing and subsequent sintering of a powder prepared from this material. The flux-conducting elements obtained as a result are comparatively brittle, mechanically delicate and are poorly processable. In addition, the joining together of the flux-conducting elements into a grid frame is very labor-intensive.

SUMMARY OF THE INVENTION

Based on this, the basic technical object of the present invention is to simplify the manufacture of the receiving unit and to overcome the drawbacks resulting from the brittleness of the flux-conducting elements.

According to the invention, a receiving unit is provided with a receiver coil for the contactless transmission of electrical energy (power), wherein a plurality of flux-conducting elements, which are intended to concentrate lines of flux and which are formed of a material with high permeability compared to that of air, are associated with the receiver coil. The receiving unit has a basic body with depressions intended for receiving the flux-conducting elements. The flux-conducting elements are formed of a contiguous shaped part, which is arranged in the depressions, and which is integrated with the basic body into a completely prefabricated assembly unit.

According to another aspect of the invention, a process is provided for manufacturing a receiving unit provided with a receiver coil for the contactless transmission of electric energy (power), wherein a plurality of flux-conducting elements, which are intended to concentrate the field intensity and are made of a material with high permeability compared to that of air, are associated with the receiver coil. The flux-conducting elements are formed in a basic body used as a shaping part. The basic body is provided with depressions intended to receive the flux-conducting elements. A liquid mixture is prepared from a casting resin and a powder of a material with high permeability, and the liquid mixture is then poured into the depressions to form the flux-conducting elements.

The present invention offers the advantage that an assembly unit, which contains the flux-conducting elements and which can be prefabricated as a complete unit in a simple manner, optionally with or without an associated receiver coil, is obtained. Since the individual flux-conducting elements are connected to one another by a casting operation and are placed in a basic body, the difficulties that have hitherto been associated with flux-conducting elements made of ferrite or the like do not occur any longer.

Further advantageous features of the present invention are discussed further below. The present invention will be explained in more detail below in connection with the attached drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 7 is a sectional view through the basic body corresponding to FIG. 6 after the receiver coil has been mounted and after a flux-conducting material has been poured in; and FIG. 8 is a schematic exploded perspective view showing the formation of an assembly unit according to the present invention, which can be used to manufacture the receiving unit.

DESCRIPTION OF THE PREFERRED EMBODIMENTS

Figure 1:
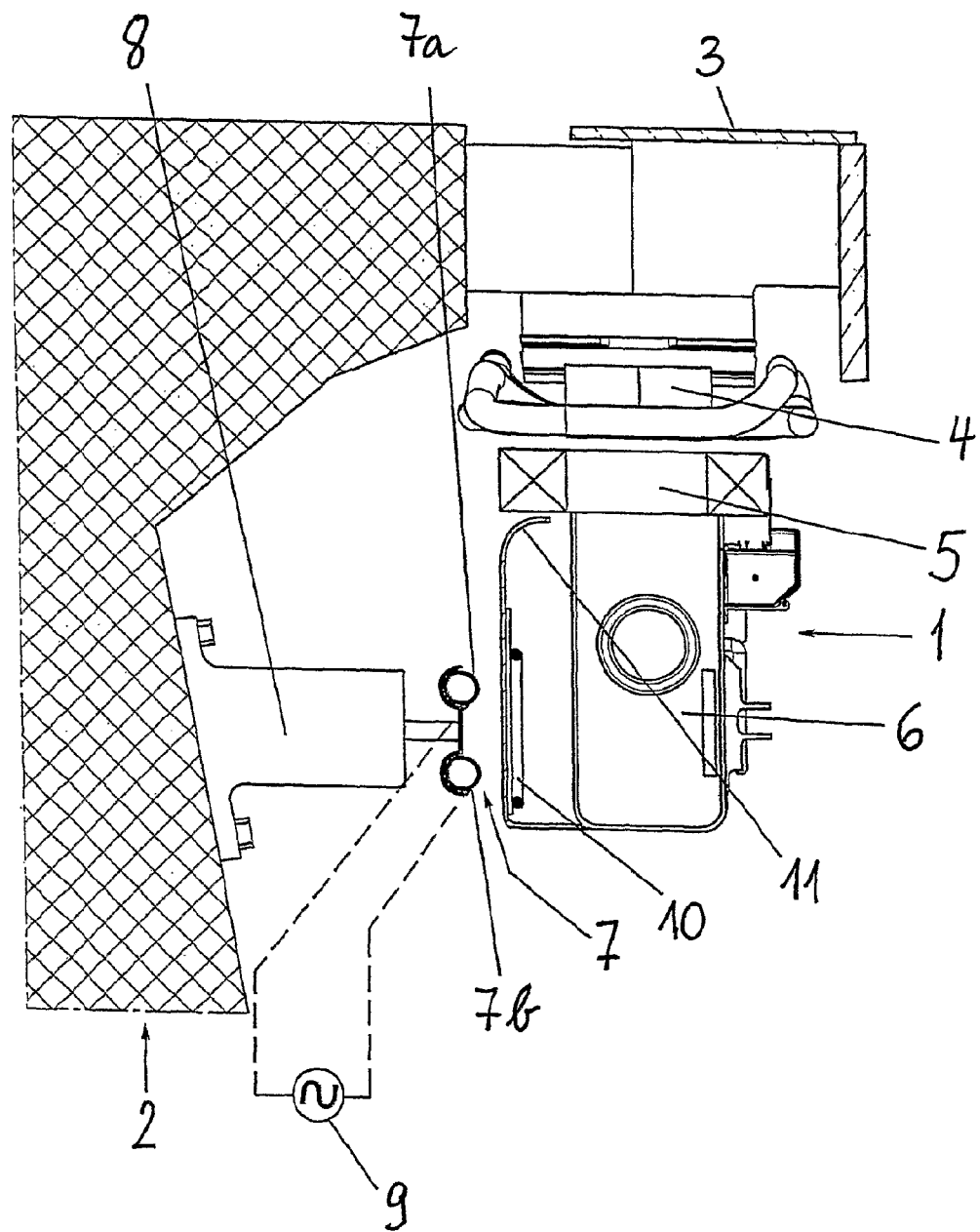
FIG. 1 is a schematic view showing a partial section through a usual magnetic levitation vehicle in the area of a track provided with a long stator.

Referring to the drawings in particular, FIG. 1 schematically shows a cross section through a magnetic levitation vehicle 1, which is mounted such that it can travel on a track, which extends in the longitudinal direction of a line and contains carriers 2 manufactured from steel and/or concrete and track panels 3 mounted on these. The magnetic levitation vehicle 1 is driven by means of a long-stator motor, which has stator packages 4 fastened under the track panel 3 and follow each other in the longitudinal direction of said track panel. The energizing field proper of the long-stator motor is generated by at least one magnet array, which is provided with carrier magnets and has magnet poles facing grooves of the stator packages 4, which said grooves are open downwardly in FIG. 1. Not only does the carrier magnet 5 provide the energizing field, but it also assumes the carrying and levitating function by maintaining a preset gap between the carrier magnet 5 and the stator packages 4 during the operation of the magnetic levitation vehicle 1. The magnet array containing the carrier magnets 5 is otherwise accommodated in a magnetic back box 6, which is fastened to the magnetic levitation vehicle 1 via laterally arranged frame straps.

A primary conductor 7, which is designed as a transmitting coil, preferably contains a line section 7a, 7b running back and forth and preferably extends over the entire length of the track, is provided along the track. The two line sections 7a, 7b are fastened to the carrier 2, e.g., by means of a bracket 8 consisting of an insulator. The primary conductor 7 is connected, in addition, to a power source 9 of, e.g., 200 A, which is preferably a high-frequency power source and is shown only schematically.

A receiving unit with a receiver coil 10 is mounted on the magnetic levitation vehicle 1. This [receiver coil] is preferably designed such that it does not extend around the primary conductor 7 but is located opposite same at a short distance only. The receiver coil 10 preferably comprises a plurality of parallel conductors, which are arranged relative to the primary conductor 7 such that they are passed through by the lines of magnetic flux generated by this [primary conductor] or the line sections 7a, 7b and the current of approx. 200 A supplied by the primary conductor 7 can be uncoupled at the terminal ends thereof, not shown. The two terminal ends, not shown, of the receiver coil 10 are connected in the known manner, e.g., with a voltage transformer, which is part of a usual power supply unit, which supplies the magnetic levitation vehicle 1 with the electric power necessary for its operation. It is clear that corresponding primary conductors 7 are preferably installed on both sides of the carrier 2 when the magnetic levitation vehicles 1 are provided with carrier magnets 5 on both longitudinal sides and that as many receiving units are provided in the longitudinal direction of the magnetic levitation vehicles 1 as are necessary for the operation of the magnetic levitation vehicles 1 or desirable for reasons of redundancy.

The receiver coil 10 is preferably manufactured as a prefabricated assembly unit together with the necessary contacting elements, e.g., plug-type connectors, and mounted on the magnetic back box 6. It is especially advantageous to mount the receiver coil 10 at or in a shell-like cover element 11, which is fastened to a rear side of the magnetic back box 6, which said rear side faces the primary conductor 7.

Figure 2:
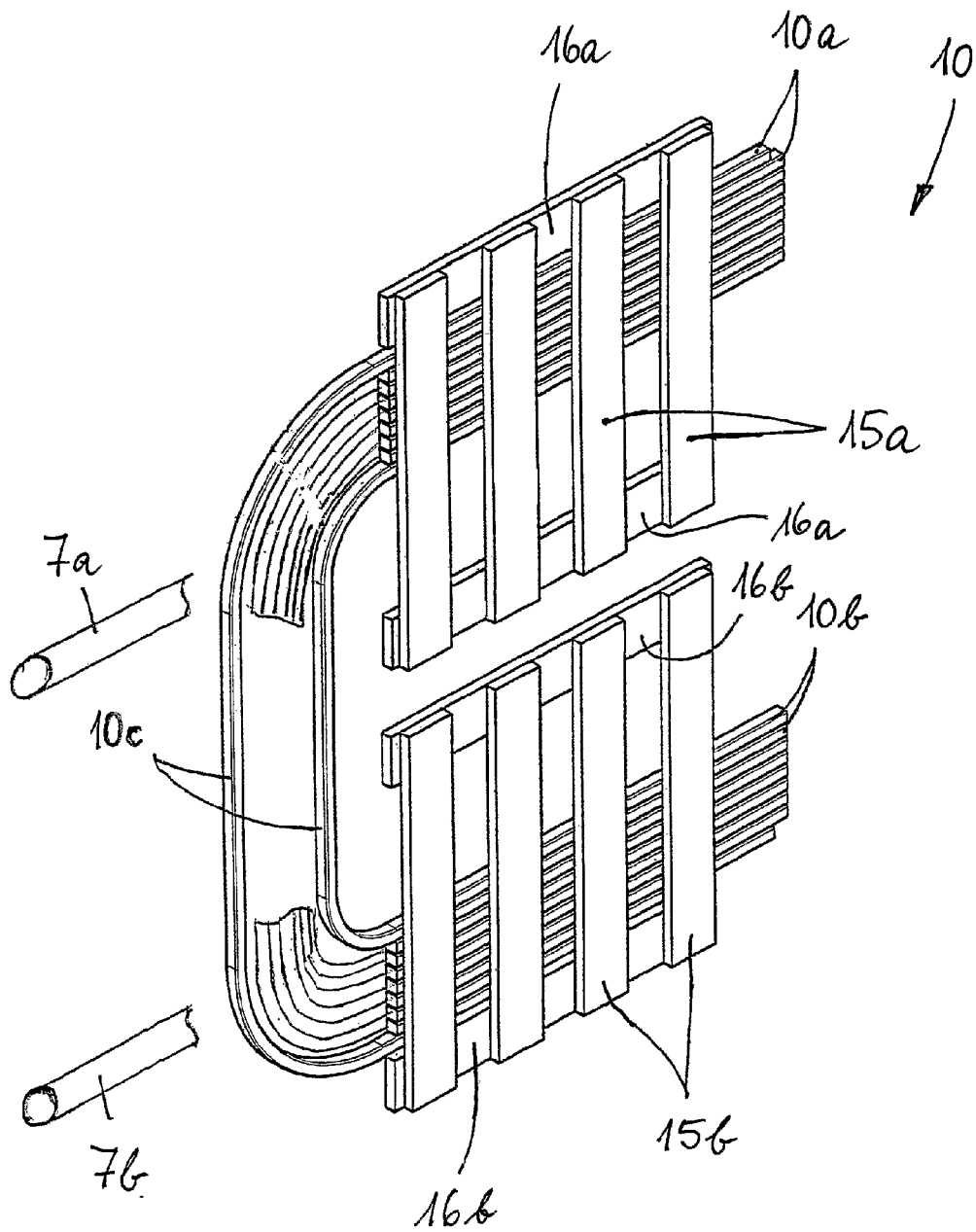
FIG. 2 is a schematic perspective and greatly enlarged view of a part of a receiving unit.

The receiver coil 10 is preferably designed in the manner of a so-called layer winding. As is shown in FIG. 2, it contains a plurality of layers located in one plane. The individual layers are preferably made of a conductor with round or square cross section and have essentially straight first and second longitudinal sections 10a, 10b, which extend in parallel to one another and along the magnet array, as well as end windings 10c, which connect the ends thereof. The longitudinal sections 10a, 10b extend in parallel to the line sections 7a, 7b of the primary conductor 7 and are used to generate voltage. The first longitudinal sections 10a are associated with the line section 7a and the second longitudinal sections 10b are associated with line section 7b of the primary conductor 7 such that the line sections 7a, 7b are arranged approximately in the middle of the layer part formed by the associated longitudinal sections 10a, 10b, as is shown especially in FIG. 3. By contrast, the conductors of the receiver coil 10 extend in the area of the end windings 10c essentially at right angles to the line sections 7a and 7b, respectively.

Figure 3:
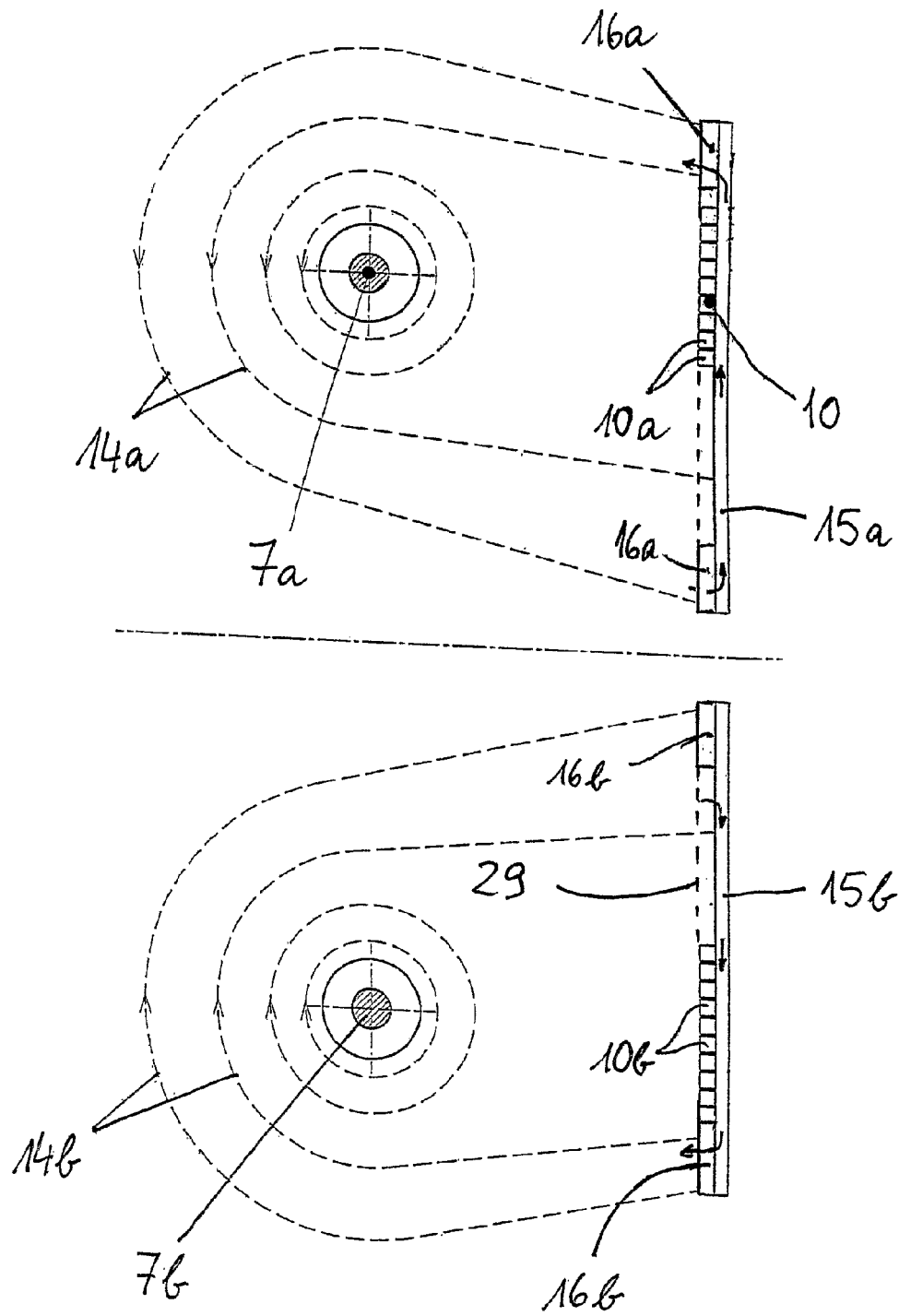
FIG. 3 is a schematic view showing a cross section through a receiver coil and the primary conductor according to FIG. 2.

To increase the magnetic coupling between the primary conductor 7 and the receiver coil 10 and to avoid eddy current losses, the receiving unit has, furthermore, on the side of the receiver coil 10 facing away from the primary conductor 7, a means for concentrating the field intensity generated by the primary conductor 7, as it is schematically indicated by lines of magnetic flux 14a, 14b in FIG. 3. This means contains flux-conducting elements, which consist of a material with high permeability and high electrical resistivity. An especially preferred material for this purpose is ferrite, especially soft ferrite, which is, however, comparatively brittle, mechanically delicate and therefore poorly processable because it is manufactured from ferromagnetic powders by pressing and subsequent sintering. The flux-conducting elements are therefore composed of many, comparatively small strips of material and connection elements, which are connected to one another by bonding or according to other methods to form grid frames.

A plurality of first material strips 15a, which are arranged essentially at right angles to the line section 7a and in parallel to the winding plane formed by the longitudinal sections 10a, are provided, e.g., on a side of the receiver coil 10 facing away from line section 7a in a construction likewise shown in FIGS. 2 and 3. A plurality of second material strips 15b, which are preferably located in the same plane as the first material strips 15a, are provided in a corresponding arrangement on a side of the receiver coil 10 facing away from line section 7b. Both material strips 15a, 15b have a length that is somewhat greater than the height of the layer parts formed by the longitudinal sections 10a, 10b, without overlapping with the ends facing each other. The individual material strips 15a, 15b are arranged in a grid-like pattern and in parallel to one another at preselected distances.

The ends of the first material strips 15a are connected to one another by first connection elements 16a, which are arranged essentially in parallel to line section 7a. The ends of the second material strips 15b are correspondingly connected by second connection elements 16b. Components designed in the manner of grid frames are formed as a result, which are fastened to the magnetic back box 6.

Both the material strips 15a, 15b and the connection elements 16a and 16b preferably consist of a ferrite. In addition, they are arranged close behind the longitudinal sections 10a, 10b and are arranged such that they bring about a concentration of the lines of flux 14a and 14b generated by the line sections 7a, 7b, as this is schematically indicated in FIG. 3. It is assumed in FIG. 3 that the current flows through line section 7*a* momentarily in a direction exiting from the drawing plane and it flows through line section 7*a* momentarily in a direction entering the drawing plane. Because of the high permeability of the material strips 15*a*, 15*b*, the lines of flux 14*a*, 14*b* are closed directly behind the line sections 10*a*, 10*b*, as is schematically indicated by arrows, as a result of which the magnetic coupling is greatly increased. Higher eddy current losses are at the same time prevented from developing because the material strips 15*a*, 15*b* and connection elements 16*a*, 16*b* magnetically shield the parts of the magnetic back box 6 located behind them because of their high permeability. Finally, the connection elements 16*a*, 16*b* shall bring about an extensively uniform distribution of the magnetic flux within the grid frame structure. The length of the material strips 15*a*, 15*b* and of the connection elements 16*a*, 16*b* is therefore preferably selected to be such that the largest possible number of lines of flux 14*a*, 14*b* are collected or concentrated.

The connection elements 16*a*, 16*b* are preferably fastened on the sides of the material strips 15*a*, 15*b* facing the line sections 7*a*, 7*b*. This leads to the advantage that they come to lie essentially in the same plane as the longitudinal sections 10 [sic-10*a*? Tr. Ed.], 10*b* of the receiver coil 10, as is shown especially in FIG. 3. As a result, no additional space is required for them, especially if their thickness, which is sufficient from a magnetic point of view, is approximately equal to the thickness of the longitudinal sections 10*a*, 10*b*.

Receiving units of the type described are known from the document DE 10 2004 056 439 A1, which is made into the subject of the present disclosure by reference to avoid further repetitions.

To simplify the manufacture of the grid frame comprising the strips 15*a*, 15*b* and connection elements 16*a*, 16*b*, a basic body 18 (FIG. 4) is used according to the present invention as a starting component, which is provided with depressions in the form of grooves or the like wherever the flux-conducting elements are to come to lie and can therefore be considered to be an organizing auxiliary means. Webs left in place between the depressions are designed such that their surfaces can also be used, at least partially, as contact surfaces for the receiver coil 10. In addition, the flux-conducting elements do not consist of individual strips and connection elements, but a contiguous shaped part, which is arranged in the depressions and which is integrated with the basic body 18 into a completely prefabricated assembly unit.

Figure 4:
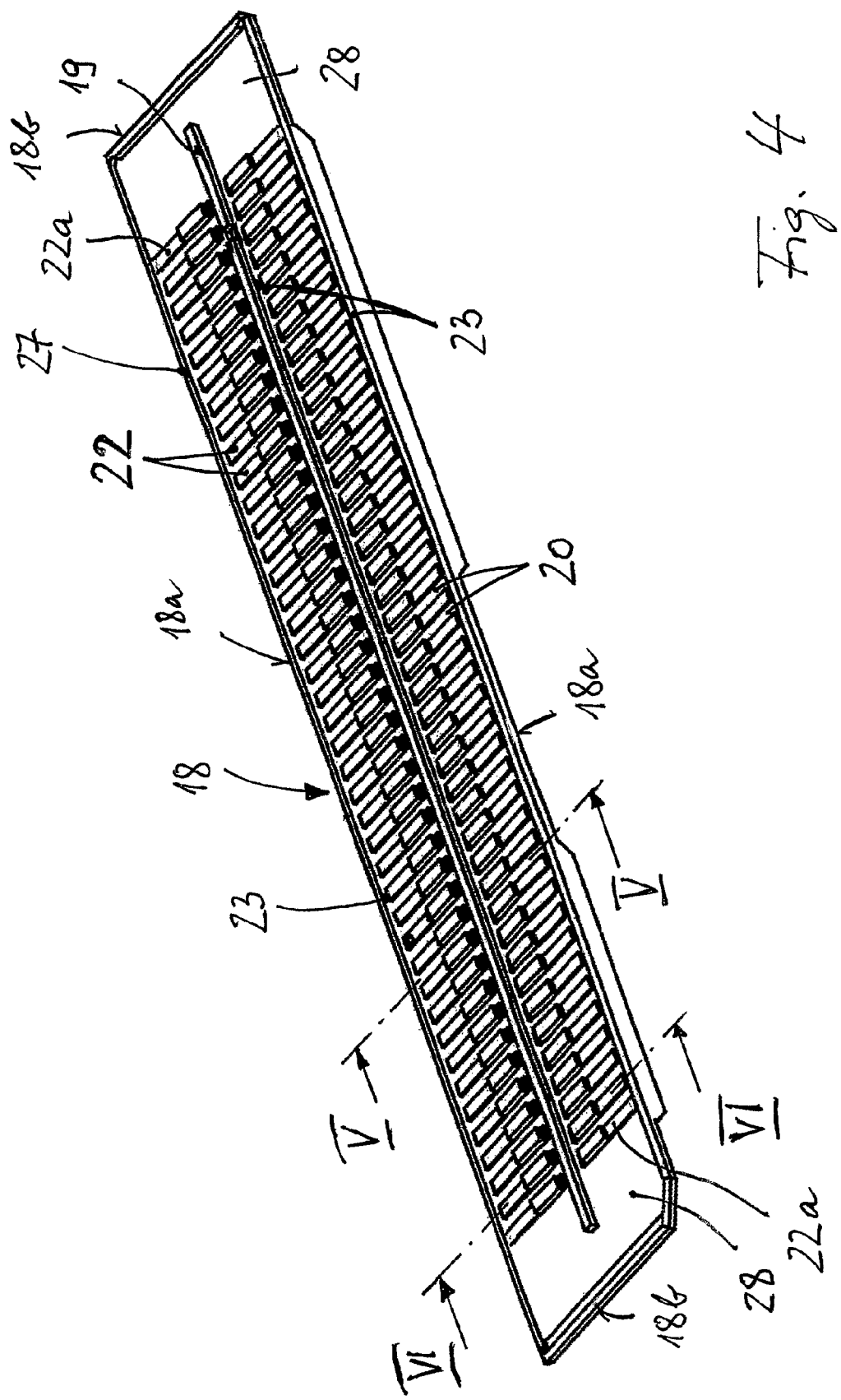
FIG. 4 is a perspective view of a basic body according to the present invention, which can be used to manufacture a receiving unit.
Figure 5:
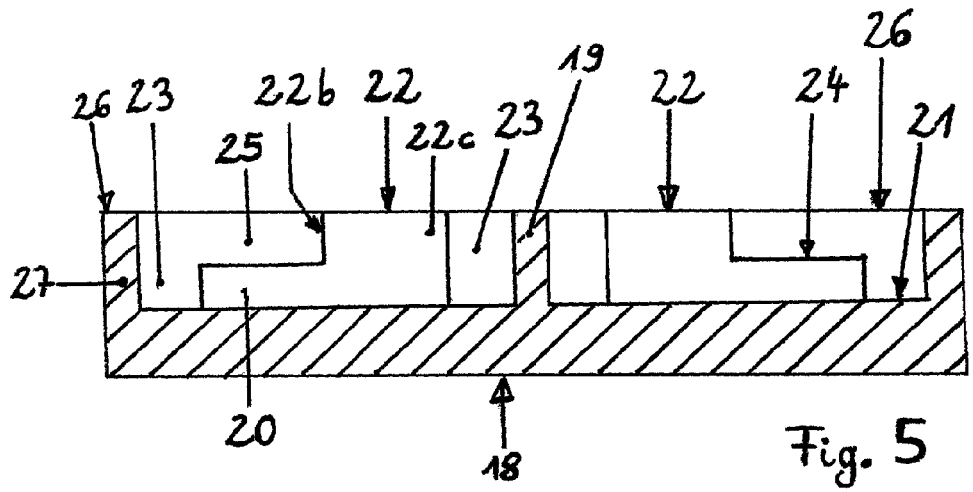
FIG. 5 is and enlarged sectional view taken along lines V-V from FIG. 4.
Figure 6:
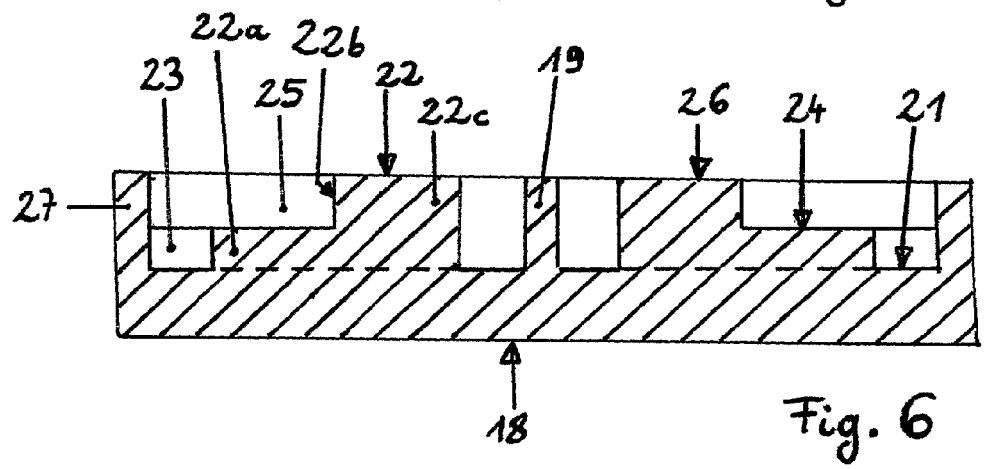
FIG. 6 is and enlarged sectional view taken along lines VI-VI from FIG. 4.

As is apparent from FIGS. 4 through 6, the basic body 18 is manufactured in the exemplary embodiment from an originally plane-parallel panel, which has, like the receiver coil 10, an essentially rectangular outer contour and has accordingly two long longitudinal sides 18*a* arranged in parallel to one another and two short, likewise essentially parallel front sides 18*b* arranged at right angles thereto. In addition, the basic body 18 is divided by a middle web 19 extending in parallel to the longitudinal sides 18*a* into two halves, which are essentially mirror-symmetrical in relation to this.

Figure 7:
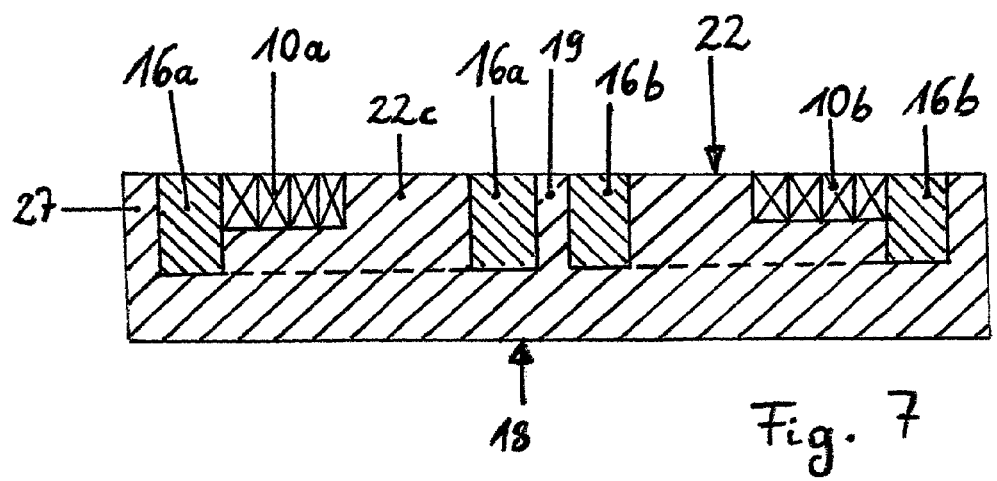

To form the strips 15*a*, 15*b* (FIG. 2), each half of the basic body 18 is provided, from its broad side that is the upper broad side in FIGS. 4 through 6, with a plurality of first depressions 20, whose lower limitations or bottoms are indicated by broken lines in FIGS. 6 and 7. The depressions 20 extend into a first plane 21 of the basic body 18 and are arranged at right angles to the longitudinal sides 18*a* and to the middle web 19, on the one hand, and in parallel to one another, on the other hand. The number and size of these depressions 20 correspond to the number and size of the strips 15*a* and 15*b* to be prepared.

Webs 22 left in place between the depressions 20 are provided according to FIGS. 5 and 6, at their ends adjoining the longitudinal sides 18*a* and the middle web 19, with second depressions 23, which likewise extend into the first plane 21 and are thus connected to the first depressions 20.

In one exemplary embodiment, which is considered to be the best so far and is shown in FIGS. 4 through 7, the height of the parts 22*a* of the webs 22 (FIG. 6) that remain after the second depressions 23 have been formed and face the longitudinal sides 18*a* is reduced, so that these parts reach only a second plane 24, which has a distance that corresponds to the thickness of the strips 15*a* and 15*b* to be prepared from the first plane 21. Third depressions 25, which are used to mount the longitudinal sections 10*a*, 10*b* of the receiver coil 10, are formed as a result. Depressions 25 extend at right angles to the longitudinal sides 18*a* of the basic body 18 from the second depressions 23 to the steps 22*b* of the webs 22 and have a length in the direction of extension that corresponds to the width of the receiver coil 10 to be inserted, whose longitudinal sections 10*a*, 10*b* can be seen in FIG. 7.

The surfaces of parts 22*c* of the webs 22, whose height is reduced, are located in a third plane 26 of the basic body 18. The surfaces of an edge section 27 of the basic body 18, which extends all around, as well as of the middle web 19 are also located in this plane 26, which has a distance from the second plane 24 that corresponds essentially to the thickness of the receiver coil 10.

The basic body 18 is provided with additional depressions 28 (FIG. 4) extending into the second plane 24 in an area each adjoining the front sides 18*b*. The size of these depressions is selected to be such that they can receive the end windings 10*c* (FIG. 2) of the receiver coil 10. In addition, the height of the different layers of the receiver coil 10 is selected to be such that after it has been placed on the upper surfaces or bottoms of the depressions 25 and 28, it closes flush with the third plane 26, as is shown in FIG. 7.

The receiving unit is advantageously manufactured in the manner shown in FIG. 8 as follows:

The basic body 18 is first provided with the depressions 20, 23, 25 and 28 and webs 22 shown in FIGS. 4 through 6 by subjecting a plane-parallel panel, e.g., to a machining process, especially various milling steps. The depressions 25 and 28 then form a space intended for receiving the receiver coil 10. This space is dimensioned such that, on the one hand, the receiver coil 10 comes into contact with step 22*b* with its inner contour 10*d* when it is inserted into the basic body 18 (FIG. 7) and is hereby positioned in the transverse direction of the basic body 18 and, on the other hand, it abuts against the free ends of the middle web 19 and is thus oriented in the longitudinal direction of the basic body 18. This state is shown in the lowermost picture in FIG. 8. In other words, steps 22*b* and the ends of the middle web 19 form stop and positioning means for exactly positioning the receiver coil 10 in the basic body 18.

The respective last webs designated by reference number 22*a* in FIG. 4 are designed without depressions 23 in the two halves of the basic body 18 in the exemplary embodiment, so that they extend to the third plane 26 in the area of the depressions 23 and have only the depressions 25 intended for inserting the receiver coil 10.

The receiver coil 10 is now inserted into the basic body 18 in a subsequent process step, as this is shown in FIGS. 7 and 8. The receiver coil 10 is now in contact with the steps 22*b*, so that the depressions 23 remain free.

A liquid mixture, which contains a curable casting resin and a powder, which consists of a material having high permeability, is prepared in another process step. A powder of ferrite, preferably a soft ferrite, is used for this, in particular. This mixture may, of course, also have been prepared already before the manufacture of the basic body 18 and/or before the insertion of the receiver coil 10 in this.

The finished mixture, which preferably contains a multi-component casting resin provided with a curing agent, is now poured into the depressions 23 left free by the receiver coil 10 by means of pouring nozzles, not shown. As an alternative, a pouring spout, which passes over the length of the depressions 23, may be used for this as well. The casting resin penetrates during the casting operation not only into the depressions 23, but also into the depressions 20, which extend between these and are partly under the receiver coil 10, and fills these completely. The basic body 18 is thus used as a casting mold. The casting resin is prevented from running out into the depressions 28 by raised webs 22a at the lateral ends of the web rows.

The casting operation is concluded when the level of casting resin has reached the third plane 26 (FIG. 7). As a result, the casting resin can rise up to level 26 in the areas located between the parts 22c of the webs 22, as this is indicated in FIG. 3 by a broken line 29. However, this does not compromise the function of the strips 15a, 15b as flux-conducting elements.

One advantage of the process described is that a shaped part of the type of a grid form is formed, which contains the strips 15a, 15b and connection elements 16a, 16b shown in FIGS. 2 and 3 with the difference that these are manufactured in one piece and form a one-piece, contiguous grid frame, which is arranged recessed in the basic body 18. Special measures for connecting the strips 15a, 15b and connection elements 16a, 16b are therefore unnecessary. Furthermore, it is advantageous that the receiver coil 10 is also already inserted into the basic body 18 and is firmly embedded in same by the casting operation. The basic body 18, receiver coil 10 and flux-conducting elements 15a, 15b, 16a, 16b therefore form a receiving and assembly unit, which is completely preassembled or can be completely preassembled and which is connected as a whole to the cover 11 (FIG. 1) of the magnetic back box 6 or can be integrated in same as a whole.

It may be advantageous when the casting process described on the basis of FIGS. 5 through 8 is used to design the flux-conducting elements 15a, 15b (FIG. 2) as panels passing over the length of the receiver coil 10. The webs 22 (FIGS. 5 through 7) may be eliminated in this case altogether and the depressions may be designed as continuous depressions in the longitudinal direction of the basic body 18. For example, the entire lower space of the basic body 18 up to level 24 (FIG. 6) would then be filled with the casting resin mixture, the receiver coil would then be inserted, and the space occupied by the flux-conducting elements 16a and 16b in FIG. 7 would finally be filled with the casting resin mixture.

The basic body 18 is preferably prepared from a plastic, especially a foam, e.g., polyurethane, and especially advantageously from a foam with damping action. However, it is also possible, as an alternative to machining, to prepare the basic body 18 as a whole by casting, foaming or pressing using a corresponding die.

The present invention is not limited to the exemplary embodiment described, which can be varied in many different ways. This applies, in particular, to the grid frame-like structure of the flux-conducting elements shown in FIGS. 2 and 3, because these may also be arranged in other advantageous patterns and can be made larger or smaller than described. It is, furthermore, possible if necessary to provide the basic body 18 only with the flux-conducting elements 15a, 15b, 16a, 16b and to fill the depressions 25 during the casting of the flux-conducting elements with a displacement body, which is designed corresponding to the receiver coil 10 in order to prevent hereby the casting resin from entering the depressions 25. The same procedure may be followed when the basic body 18 is manufactured by casting, pressing or the like in order to keep the depressions 25 and 28 free for the receiver coil 10. The receiver coil 10 would then be inserted into the assembly unit formed from the basic body 18 and the flux-conducting elements 15a, 15b, 16a, 16b. The complete receiving unit would be of a two-part design in this case. Furthermore, it is clear that the receiver coil 10 is provided with connection contacts, not shown, at suitable points and the depressions 28 may be absent altogether, especially when it is desirable to bend off the end windings 10c to the rear analogously to DE 10 2004 056 439 A1. Finally, it is obvious that the different features may also be used in combinations other than those described and shown.

While specific embodiments of the invention have been shown and described in detail to illustrate the application of the principles of the invention, it will be understood that the invention may be embodied otherwise without departing from such principles.

The invention claimed is:

1. A receiving unit comprising:
   a receiver coil for a contactless transmission of electrical energy;
   a plurality of flux-conducting elements to concentrate lines of flux the flux-conducting elements being formed of a material with high permeability compared to that of air, the flux-conducting elements being associated with the receiver coil
   a basic body with depressions in a grid frame structure receiving the flux-conducting elements, the flux-conducting elements being formed of a single contiguous shaped part by pouring, which is arranged in the depressions, which has a grid frame structure and which is integrated with the basic body into a completely prefabricated assembly unit.

2. A receiving unit in accordance with claim 1, wherein the basic body is provided with stop and positioning means for positioning the receiver coil.

3. A receiving unit in accordance with claim 1 wherein the basic body is provided with webs for supporting the receiver coil between the depressions.

4. A receiving unit in accordance with claim 1, wherein the basic body consists of a plastic.

5. A receiving unit in accordance with claim 4, wherein the basic body is formed of a foam.

6. A receiving unit in accordance with claim 1, wherein the receiver coil has two longitudinal sections arranged at spaced locations and end windings connecting the two longitudinal sections.

7. A receiving unit in accordance with claim wherein the basic body has a space, which is intended to receive the receiver coil and which contains webs used to support longitudinal sections of the receiver coil and depressions in the basic body, which are arranged laterally from the flux-conducting elements.

8. A receiving unit in accordance with claim 1, wherein the flux-conducting elements are formed of a material containing a ferrite.

9. A receiving unit in accordance with claim 1, wherein the flux-conducting elements contain strips extending at right angles to longitudinal sections of the receiver coil and connection elements, which extend in parallel to the longitudinal sections and connect the strips to one another.

10. A process for manufacturing a receiving unit provided with a receiver coil for a contactless transmission of electric energy, wherein a plurality of flux-conducting elements, which are intended to concentrate the field intensity and are made of a material with high permeability compared to that of air, are associated with the receiver coil, the process comprising the steps of:
   forming the flux-conducting elements in a basic body used as a shaping part by the basic body being provided with depressions arranged in a grid frame structure receiving the flux-conducting elements;
   preparing a liquid mixture from a casting resin and a powder of a material with high permeability; and
   pouring the liquid mixture into the depressions to form the flux-conducting elements as a single contiguous shaped part comprising a grid structure.

11. A process in accordance with claim 10, wherein the basic body is provided with webs for supporting the receiver coil between the depressions.

12. A process in accordance with claim 10, wherein the mixture is cured or is allowed to cure after casting.

13. A process in accordance with claim 10, wherein the webs are provided with steps intended to be in contact with the receiver coil.

14. A process in accordance with claim 10, wherein the basic body is made of plastic.

15. A process in accordance with claim 13, wherein the basic body is made of a foam.

16. A process in accordance with claim 10, wherein the depressions are prepared by machining a panel forming the basic body.

17. A process in accordance with claim 10, wherein the basic body is made of at least one of plastic and a foam and the basic body is prepared in a mold designed as a negative mold of the basic body by casting, foaming or pressing.

18. A process in accordance with claim 10, wherein the basic body is provided with a space intended for receiving the receiver coil.

19. A process in accordance with claim 18, wherein the basic body is prepared in a mold designed as a negative mold of the basic body by casting, foaming or pressing and the space is prepared by inserting a displacement body in the mold.

20. A process in accordance with claim 19, wherein the receiver coil is inserted into the basic body before the mixture is poured in.

21. A receiving unit comprising:
   a receiver coil for a contactless transmission of electrical energy;
   a plurality of flux-conducting elements to concentrate lines of flux, the flux-conducting elements being formed of a material with high permeability compared to that of air, the flux-conducting elements being associated with the receiver coil, the flux-conducting elements together comprising a single contiguous shaped part with a grid structure;
   a basic body with depressions in a grid frame structure, the depressions in the grid frame structure receiving the single contiguous shaped part, the basic body and single contiguous shaped part with associated receiver coil forming a completely prefabricated assembly unit.

22. A receiving unit according to claim 21, wherein said flux-conducting elements are formed as said single contiguous shaped part by providing said depressions in the grid frame structure as a mold and pouring a liquid mixture including said material into said depressions in the grid frame structure wherein said flux-conducting elements have an outer surface that is complementary to said depressions in the grid frame structure.

* * * * *